United States Patent [19]
Menke et al.

[11] Patent Number: 5,818,802
[45] Date of Patent: Oct. 6, 1998

[54] DISC PLAYER WITH RIGID GRIPPER ARM AND SLED

[75] Inventors: Wilhelm Menke; Boerge Heidersberger, both of Bingen, Germany

[73] Assignee: NSM Aktiengesellschaft, Bingen, Germany

[21] Appl. No.: 553,673

[22] PCT Filed: Jun. 6, 1994

[86] PCT No.: PCT/DE94/00639

§ 371 Date: Mar. 29, 1996

§ 102(e) Date: Mar. 29, 1996

[87] PCT Pub. No.: WO94/29861

PCT Pub. Date: Dec. 22, 1994

[30] Foreign Application Priority Data

Jun. 12, 1993 [DE] Germany ............................ 43 19 551.2

[51] Int. Cl.[6] ............................ G11B 17/22; G11B 17/04
[52] U.S. Cl. ............................ 369/36; 369/179; 369/192
[58] Field of Search ................... 369/34, 36, 38, 369/39, 178, 191, 192, 193, 194, 179; 360/98.04, 98.06

[56] References Cited

U.S. PATENT DOCUMENTS

| | | | |
|---|---|---|---|
| 4,614,474 | 9/1986 | Sudo | 369/192 |
| 4,993,010 | 2/1991 | Kishimura et al. | 369/36 |
| 5,123,000 | 6/1992 | Fitzgerald et al. | 369/191 |
| 5,228,016 | 7/1993 | Menke | 369/36 |
| 5,267,225 | 11/1993 | Fukasawa et al. | 369/36 |
| 5,289,441 | 2/1994 | Domberg et al. | 369/191 |
| 5,414,679 | 5/1995 | Menke | 369/36 |
| 5,539,712 | 7/1996 | Menke et al. | 369/36 |

FOREIGN PATENT DOCUMENTS

| | | |
|---|---|---|
| 0138005A1 | 4/1985 | European Pat. Off. . |
| 0280263A2 | 8/1988 | European Pat. Off. . |
| 0439483B1 | 9/1992 | European Pat. Off. . |
| 2164781A | 3/1986 | Germany . |
| 4205912A1 | 8/1992 | Germany . |
| 62-124662 | 6/1987 | Japan ........................ 369/36 |
| 6-84265 | 3/1994 | Japan ........................ 369/178 |
| WO90/04845 | 3/1990 | WIPO . |
| 4005058A1 | 8/1990 | WIPO . |
| WO92/13343 | 8/1992 | WIPO . |
| WO93/08569 | 4/1993 | WIPO . |

*Primary Examiner*—Stuart S. Levy
*Assistant Examiner*—David L. Ometz
*Attorney, Agent, or Firm*—Spencer & Frank

[57] ABSTRACT

A disc player has two opposite disc magazines with a plurality of disc holders which each receive a disc and are arranged one above the other in compartments. A transport arrangement movable in the direction of the stack of discs in the magazine conveys a desired disc with its associated disc holder between the compartment and a playback unit. The transport arrangement has a horizontally movable pulling-out arrangement provided with a carriage with a pick-up arm. In order to simplify the construction, the pick-up arm, which is rigidly linked to the carriage of the delivery arrangement, may be horizontally moved between and vertically moved within the disc magazines.

29 Claims, 8 Drawing Sheets

DISC PLAYER WITH RIGID GRIPPER ARM AND SLED

BACKGROUND OF THE INVENTION

The invention relates to a disc player having two disc magazines which are located opposite one another and have a plurality of disc holders which are stacked one above the other in receiving compartments and each receive a disc, and having a transport device which can move in the direction of the stacks of the two disc magazines in order to transfer a desired disc, with the associated disc holder, between the receiving compartment and a playback unit, with the transport device encompassing a horizontally-traveling withdrawal device which includes a sled having a gripper arm.

A disc-changing apparatus in which a vertically-traveling disc-removal apparatus is disposed between two vertical disc magazines which store disc covers with discs, the apparatus supporting a disc cover gripper that can travel horizontally on this removal device, is known from EP 0 138 005 B1. This disc cover gripper is provided with two gripper devices, of which one is selectively located in its ready position in the left or right disc magazine, while the other gripper device holds a removed disc cover in the center position, in which the disc is located above the turntable of the playback device. Thus, each disc magazine is allocated a separate gripper device. Each gripper device encompasses two hook elements which can be operated electromagnetically when the disc-removal apparatus is located in a first position or second position for removing a disc cover from the first or second disc magazine. Hence, on the one hand, the arrangement of two gripper devices and, on the other hand, the mechanical control of the movable gripper devices, dictate a considerable production outlay.

Moreover, EP 0 280 263 A2 discloses a disc player in which the discs are deposited in two stacks and can be played in two playback stations. The individual discs can be played from two sides. They are not returned to the same stack after being played. In this apparatus, an endless conveyor belt is configured as a withdrawal device. The position of the withdrawal device in this apparatus cannot be used to control the position of the discs. With the slightest irregularities in the transport of the discs, for example in the release of the discs from the playback device, or vibrations of the system, unacceptable sensitive disturbances are to be expected in operation.

Furthermore, EP 0 439 483 B1 discloses a disc player having two disc magazines located opposite one another and a transport device which can move in the direction of the stack of the disc magazines in order to convey a disc back and forth between the disc magazines and a playback unit, the device also having two withdrawal devices which can be controlled independently of one another and travel horizontally on the transport device, and each have a gripper arm. Each gripper arm is seated in a sled so as to extend and retract, the sled being able to be moved back and forth; in the initial position of the sled, the arm is held in its retracted position by a spring-loaded bell-crank lever having an associated stop lever such that, when the sled moves out of the initial position, the arm can be brought into the extended position by the bell-crank lever, in which position it engages a recess of a disc holder for a disc. Consequently, each disc magazine is allocated a movable gripper arm that is to be controlled separately, which stipulates a relatively costly construction.

SUMMARY OF THE INVENTION

The object of the invention is to create a disc player of the type mentioned at the outset which permits a simple and compact design for the conveyance of a disc holder, with the desired disc, from the respective disc magazine to the respective playback unit and back.

In accordance with the invention, this object is accomplished in that the gripper arm is rigidly connected to the sled of the withdrawal device and can travel horizontally between the disc magazines and vertically in them.

The essential advantage achieved with the invention is the possibility of conveying a disc from both the one and the other disc magazine with a single gripper arm, resulting in an relatively small overall size of the disc player. No electrical actuators, sensors or trailing cables are necessary on the transport device. A further essential simplification results from the rigid attachment of the gripper arm to the sled of the withdrawal device, because this eliminates a separate pivoting or displacement device for the gripper arm regarding its position with respect to the withdrawal device. In the selection of a specific disc, the gripper arm is therefore controlled by a control unit of the disc player in such a way that it first moves into the disc magazine in which the selected disc is located, and then travels inside the disc magazine until it reaches the position of the desired disc, in which position the gripper can remove the disc holder, with the selected disc, from the disc magazine. The gripper arm subsequently conveys the disc holder, with the selected disc, into a position on the transport device which is oriented toward the turntable of the playback unit, and the transport device then conveys the disc to the playback unit. After the disc has been played, it is deposited again in the relevant disc magazine with the aid of the transport device and the gripper arm.

So that the gripper arm can be moved up and down in the individual disc magazines in a simple manner, according to an advantageous embodiment of the invention, the gripper arm can travel vertically out of its assumed selection position in one or the other disc magazine and into superposed recesses of the disc holders of the respective disc magazine.

To achieve easy removal of the selected disc from the relevant disc magazine, according to a further embodiment of the invention, the gripper arm can be moved out of its selection position in one or the other disc magazine and into a withdrawal position for removing a specific disc, in which position it is aligned with an advancement lug chamfered at half the height of the disc holder and adjoining the recess of the disc holder.

For precise orientation of a selected disc with respect to the playback unit, in accordance with an advantageous modification of the invention, the gripper arm can travel, by means of a disc holder recognition device associated with the transport device, into a centering position which fixes the selected disc, with the disc holder, concentrically with respect to the turntable of the playback unit.

In an alternative solution to the object of the invention, the transport device is allocated a disc holder recognition device having a sensing element such that, when a disc holder removed from a disc magazine impacts against the sensing element, the gripper arm which is rigidly connected to the sled of the withdrawal device travels into a centering position which fixes the selected disc, with the disc holder, concentrically with respect to the turntable of the playback unit. With this measure, an exact orientation of the selected disc with respect to the playback unit is always assured with a low structural outlay.

A further alternative solution to the object of the invention is distinguished by the fact that a housing is provided which comprises a bottom plate and a cover plate that are connected to each other solely by connecting elements. This type of housing can be produced particularly cost-effectively. The connecting elements in this instance are preferably configured as rods, angled sheet metal, profiles or the like. Panelling elements are advisably provided between the connecting elements of the bottom plate and the cover plate of the housing.

In order to be able to use disc magazines of different heights, in a modification of the invention the cover plate can be removed and the length of the connecting elements can be changed. At least one stabilizing element is preferably provided between the cover plate and the bottom plate in order to increase the rigidity of the housing.

In a further alternative solution of the object of the invention, the disc magazines are inserted into the housing from the top side of an associated housing so as to be vertically exchangeable. With this measure, no free space to the side of the disc player is necessary for the exchange process of the disc magazines.

According to another alternative solution of the object of the invention, the transport device can travel vertically on a rotatably driven support rod by means of a drive, with the rod driving the sled of the withdrawal device connected rigidly to a gripper arm by way of a gear. With this measure, a drive system which can be accommodated in an extremely small space results for the transport device and the withdrawal device, with the operation of the transport device and the withdrawal device being effected without electrical drive elements disposed inside the transport device. The transport device, which is seated to slide on the support rod, can advisably be moved up and down by means of a belt drive having a drive motor which can reverse its direction of rotation. Of course, a cable pull drive, spindle drive or the like can be used instead of the belt drive.

In order to attain reliable guidance of the transport device, in accordance with a modification of the invention the transport device has a lateral notch which extends around a vertical, housing-secured guide rod secured to the housing so as to slide.

The drive motor of the transport device preferably has on its shaft a coding disk which cooperates with a sensor that generates positioning pulses. Consequently, it is ensured that the transport device is held precisely and division-true in front of the receiving compartments of the disc magazines. A sensor for determining the initial position of the transport device directly above the playback unit is advisably associated with the transport device.

To attain a reliably-functioning drive of the gripper arm, according to a further embodiment of the invention, the rotatably-seated support rod of the transport device is connected by way of a sliding clutch and a gear to the drive motor which can reverse its direction of rotation, and the support rod supports a toothed wheel which is displaceable on the support rod inside the transport device and is fixed against relative rotation, and meshes with at least one toothed wheel that engages a toothed rack disposed on the sled of the gripper arm.

The support rod is advisably fixedly connected to a coding disk which runs by means of stationary sensors for generating switching pulses for the drive motor of the support rod. The coding disk is preferably configured as a perforated or marking disk.

In accordance with an advantageous modification of the invention, the disc holder recognition device encompasses a mechanical sensor which is guided in a spring-loaded manner in the housing of the transport device and projects into the path of movement of the disc holder; during impact by the disc holder, this sensor limits the rotational movement of the toothed wheel disposed on the support rod. A pin which can move through a passageway in the underside of the sensor in the inoperative state of the sensor, and, in the operative state of the sensor, rests against a stop projecting into the passageway in the centered position of the disc holder with respect to the playback unit, is advisably provided on the top side of the toothed wheel disposed on the support rod. Furthermore, the sensor preferably has in the front region on its top side a web which, in the inoperative state of the sensor, rests in a spring-loaded manner against a stop secured to the housing. A stop secured to the housing advisably rests against the housing-secured stop for the web of the sensor in the region opposite the support rod; a compression spring which rests with its other end against the web of the sensor is supported against the first-mentioned stop.

So that the sensor can recognize a disc holder received by the transport device, in an embodiment of the invention the sensor guided on a holding element extends with its front region beyond a housing-secured guide rail for the disc holder.

For reliable reception of a disc holder in the transport device, in a further advantageous embodiment of the subject of the invention, the housing of the transport device has a support arm having a holding rail for the disc holder, the rail being disposed opposite the housing-secured guide rail, with at least one spring element which secures the disc holder in its centered position with respect to the playback unit being associated with the holding rail. The spring element is advisably molded onto the holding rail, and latches in an associated notch of the disc holder. As an alternative, the spring element preferably comprises a U-shaped yoke whose legs are inserted into depressions on the support arm, and whose web has a bead in the center which engages a notch located on the corresponding longitudinal side of the disc holder.

To facilitate the exchange of discs in the disc magazines, in an advantageous embodiment of the invention, each disc magazine inserted in drawer fashion into the housing from the front side of the housing is secured in its position by at least one detachable connection. The detachable connection between the disc magazine and the housing is advisably configured as a clip connection.

For secure holding of the disc magazines, the housing preferably has two oppositely-located guide rails for receiving each disc magazine; these rails correspond with a corresponding groove in the bottom wall or cover wall, respectively, of the disc magazine. Formed in each guide rail is a clip tongue having a projecting clip latch which latches in an associated opening in the bottom wall or cover wall, respectively, of the disc magazine.

It is understood that the features cited above and explained below can be used not only in the disclosed combination, but also in other combinations or alone, without exiting the scope of the present invention.

BRIEF DESCRIPTION OF THE DRAWINGS

The concept underlying the invention is described in detail, in conjunction with an embodiment illustrated in the drawing, in the following description. Shown are in.

DESCRIPTION OF THE PREFERRED EMBODIMENTS

Figure 1:
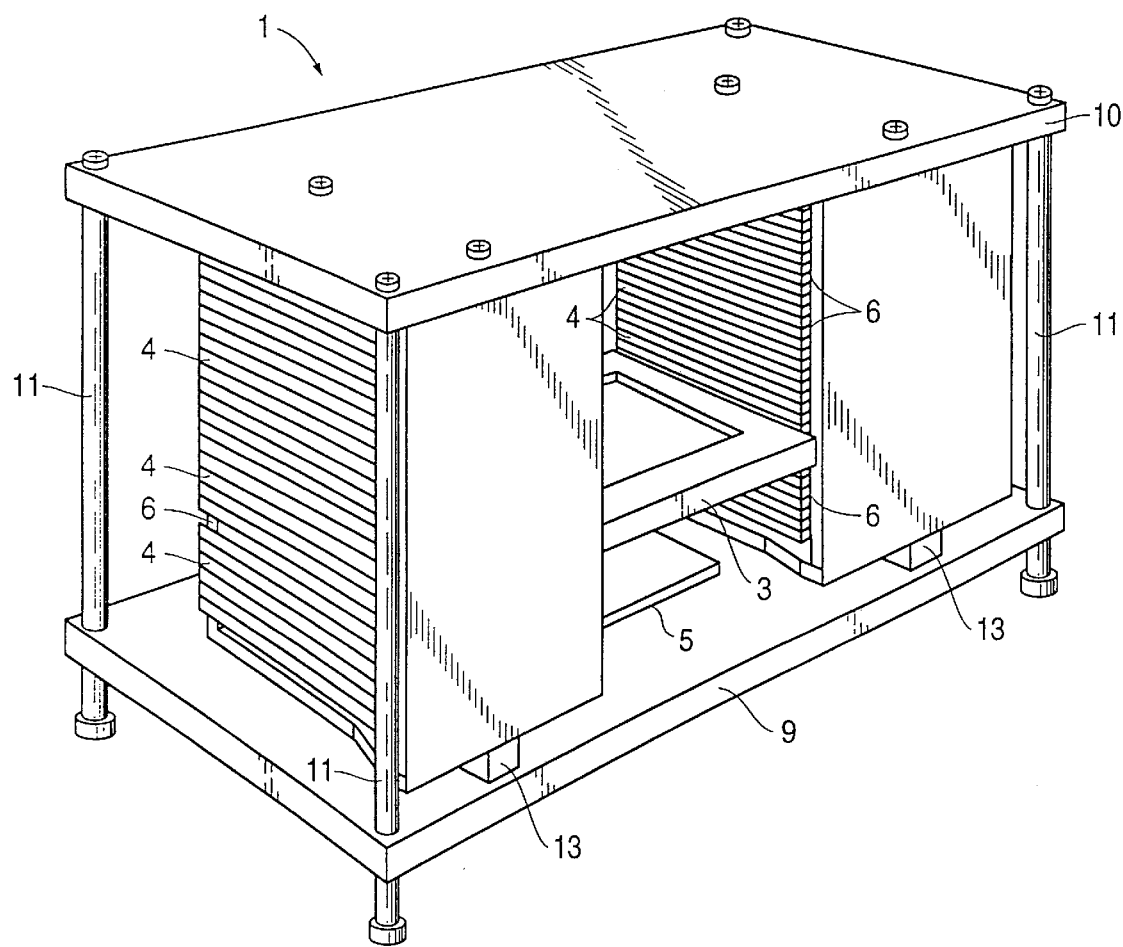
FIG. 1 a view in perspective of a disc player.

The disc player equipped with a central control unit, not shown, by means of which information stored on the discs can be read out and reproduced, includes a housing 1 which has an associated operating panel, not shown, that includes different keys, for example a disc selection key, a disc playback key and a stop key. Disc magazines 2 are disposed opposite one another and laterally in the housing 1. A transport device 3 for a disc holder 4 which receives a disc is disposed so as to travel up and down in the space between the disc magazines 2. A playback unit 5 having a turntable, a motor for rotating the turntable and a playback head, none shown in detail, is fixedly disposed between and beneath the two oppositely-located disc magazines 2.

The disc magazines 2 are constructed identically, and include a plurality of receiving compartments 6 disposed one above the other for storing a corresponding plurality of disc holders 4 which each receive a disc. The disc holder 4 is secured in its position in the receiving compartment 6 by at least one spring element 7 disposed on the disc magazine 2. In this position the disc holder 4 projects so far beyond the two sides of the disc magazine 2 from which it can be withdrawn that it can be gripped by a withdrawal device 8 of the transport device 3. Each disc magazine 2 can be inserted in drawer fashion into the housing 1 from the front side of the housing 1 so as to be exchanged. The housing 1 comprises a rectangular bottom plate 9 and a rectangular cover plate 10 which is disposed at a specific distance therefrom, the two plates being connected to each other by means of connecting elements 11 configured as rods and disposed at the corners. The cover plate 10 is removable, and the connecting elements 11 can be changed in length, so that disc magazines 2 of different heights can be used. Moreover, a stabilizing element 12 configured as a rod extends between the bottom plate 9 and the cover plate 10 in order to increase the rigidity of the housing 1. Guide rails 13 for each disc magazine 2, which correspond with a corresponding groove 14 in the bottom wall 15 or in the cover wall 16, respectively, of the disc magazine, are disposed opposite one another on the inside of the bottom plate 9 and on the inside of the cover plate 10. Formed into each guide rail 13, in the direction of insertion of the disc magazine 2, is a clip tongue 17 having a projecting clip latch 18 which latches in an associated opening 19 in the bottom wall 15 or the cover wall 16, respectively, of the disc magazine. The clip connections release automatically when the disc magazine 2 is removed from the housing 1.

On its side facing the transport device 3, the disc holder 4 has a throughgoing recess 20 in each end region. An advancement lug 21 which is chamfered outwardly and from below at half the height of the disc holder 4 adjoins each recess 20, and a free passageway 22 to the recess 20 is located beneath this lug. Corresponding to the position of the disc holder in one or the other disc magazine 2, a gripper arm 23 of the withdrawal device 8 of the transport device 3 can travel into one of the recesses 20 through the passageway 22. By means of appropriate control of the transport device 3, the gripper arm 23 can then travel vertically so far into the superposed recesses 20 of the disc holders 4 that the gripper arm is located behind the advancement lug 21 of the disc holder 4 with the selected disc. The gripper arm 23 subsequently conveys the disc holder 4 to a support arm 25 attached to the housing 24 of the transport device 3, with the path of travel of the gripper arm 23 being controlled by a disc holder recognition device 26, which is associated with the transport device 3, in such a way that the disc holder 4 assumes a centered position which fixes the selected disc concentrically with respect to the turntable of the playback unit 5. The transport device 3 subsequently conveys the disc holder 4 to the playback unit 5, in which the reading out of information takes place. After the information has been read out, the disc is conveyed in analogous fashion back into its associated receiving compartment 6 by the transport device 3. Then the transport device 3 returns to its initial position directly above the playback unit 5, with the initial position being monitored by a sensor 27.

Figure 2:
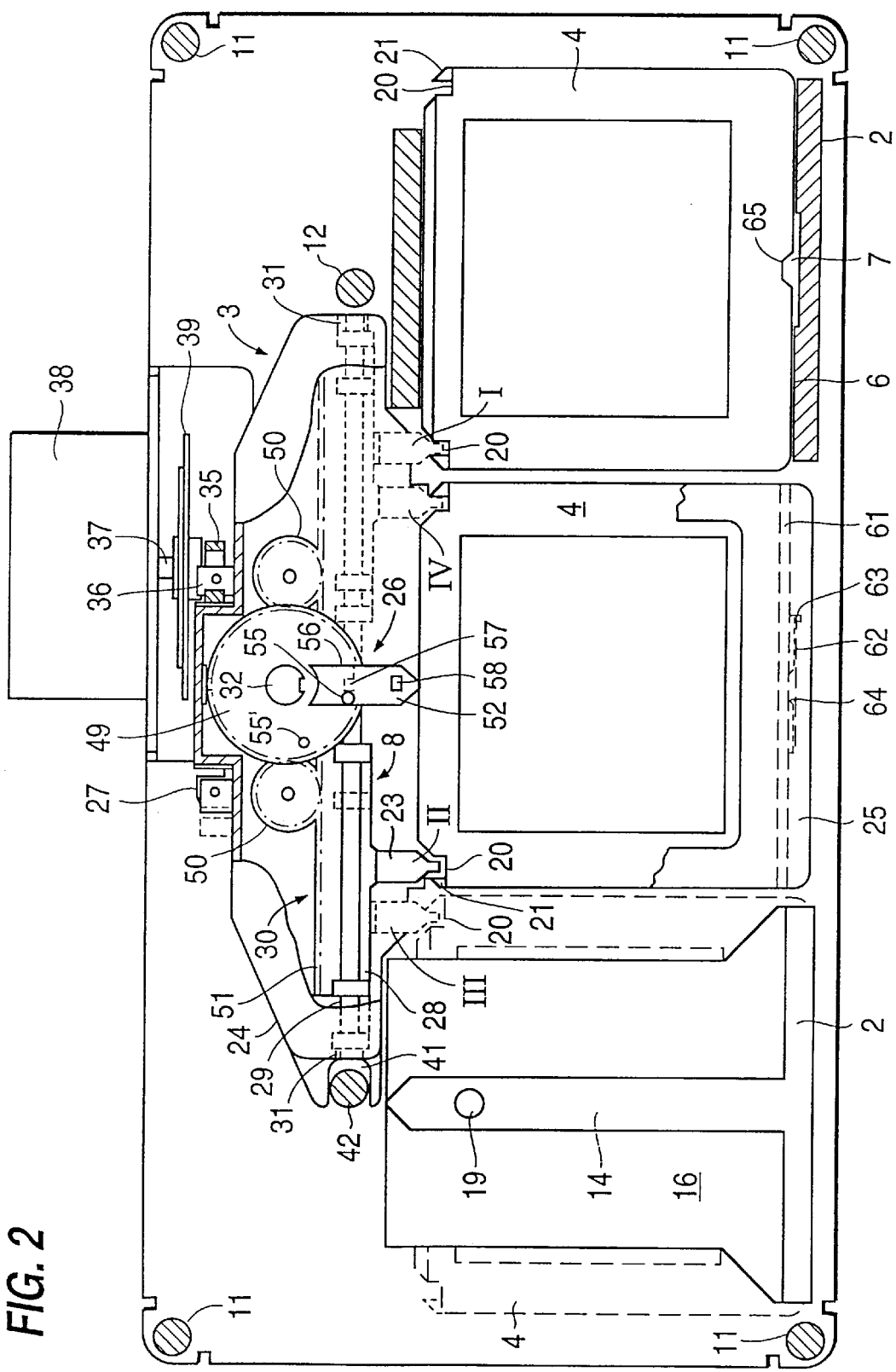
FIG. 2 a cross-section through the disc player according to FIG. 1.
Figure 3:
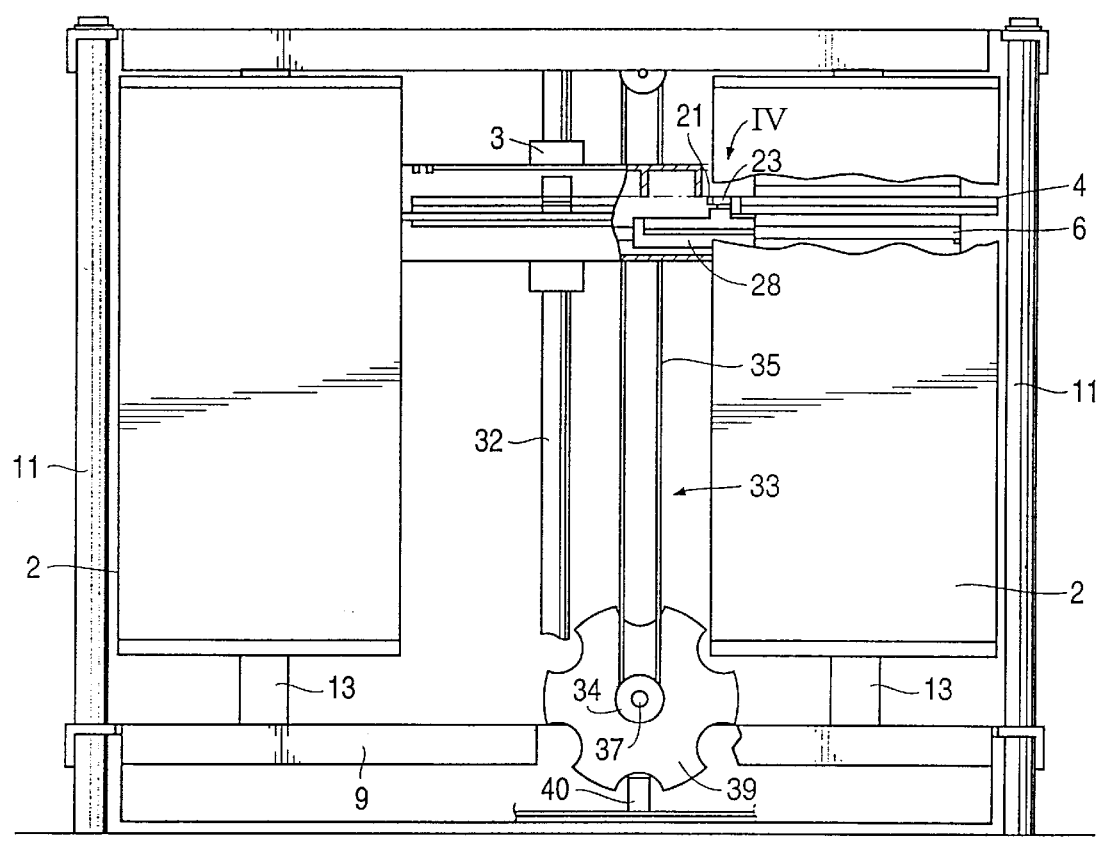
FIG. 3 a rear view of the disc player according to FIG. 1.
Figure 4:
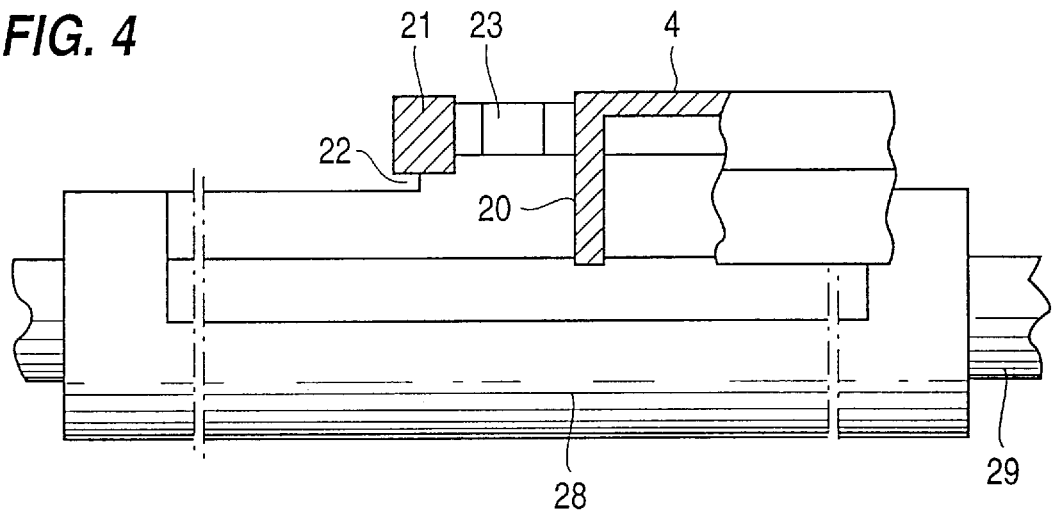
FIG. 4 an enlarged representation of the detail IV with a gripper arm located in the withdrawal position, FIG. 5 the representation according to FIG. 4 with a gripper arm located in the selection position, FIG. 6 a longitudinal section through the disc player according to FIG. 1 with a removed disc magazine, FIG. 7 an enlarged representation of the detail VII according to FIG. 6 with a disc holder located in the transport device, FIG. 8 the representation according to FIG. 7 without a disc holder, and FIG. 9 an alternative embodiment of the disc player according to FIG. 1 with disc magazines which can be inserted into the housing from above so as to be exchanged.
Figure 5:
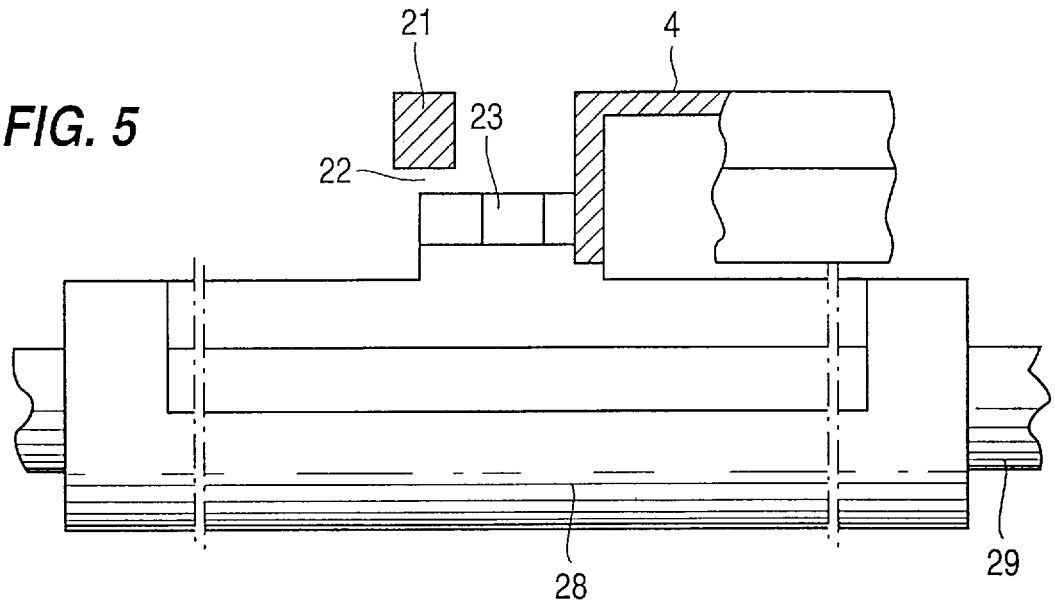
Figure 6:
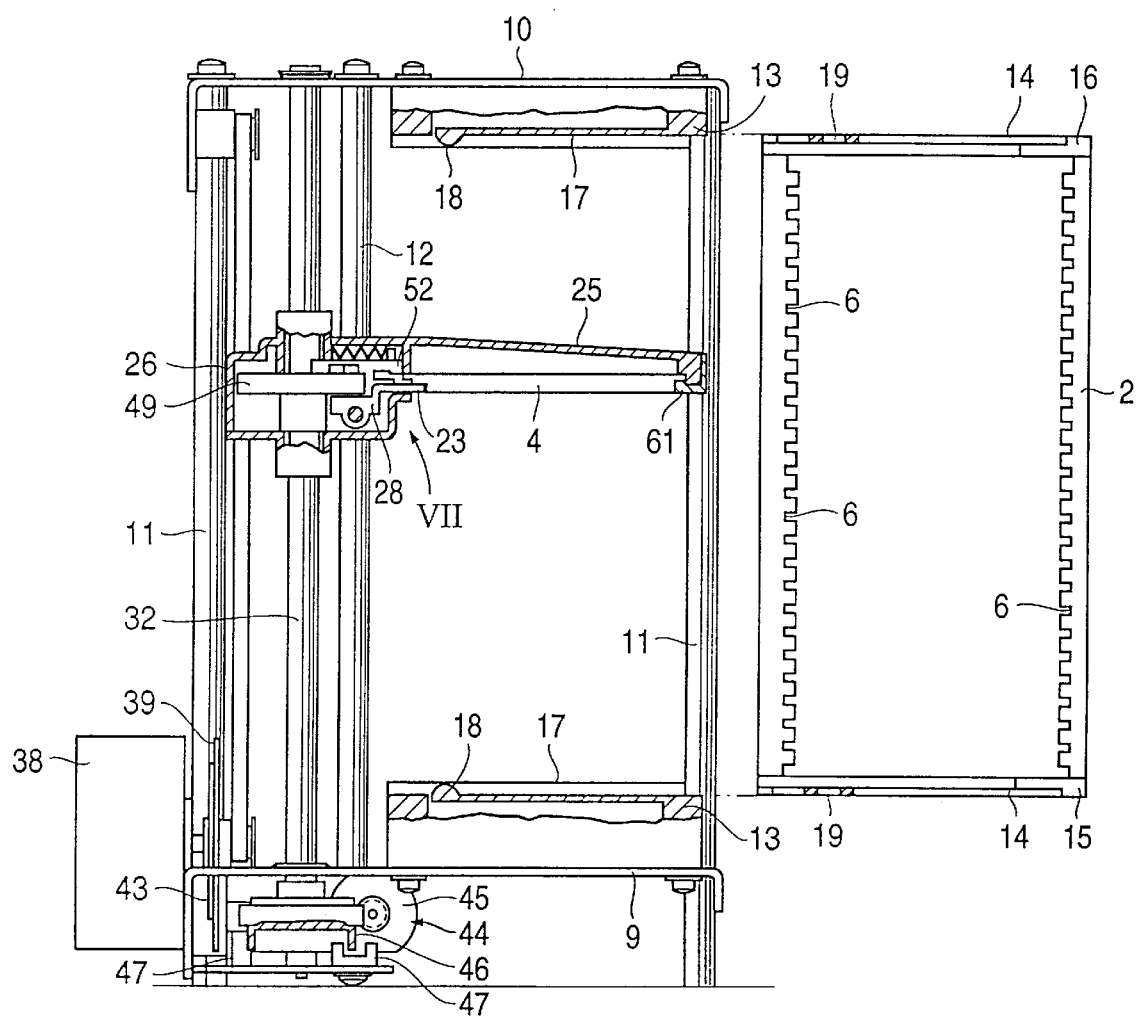
Figure 7:
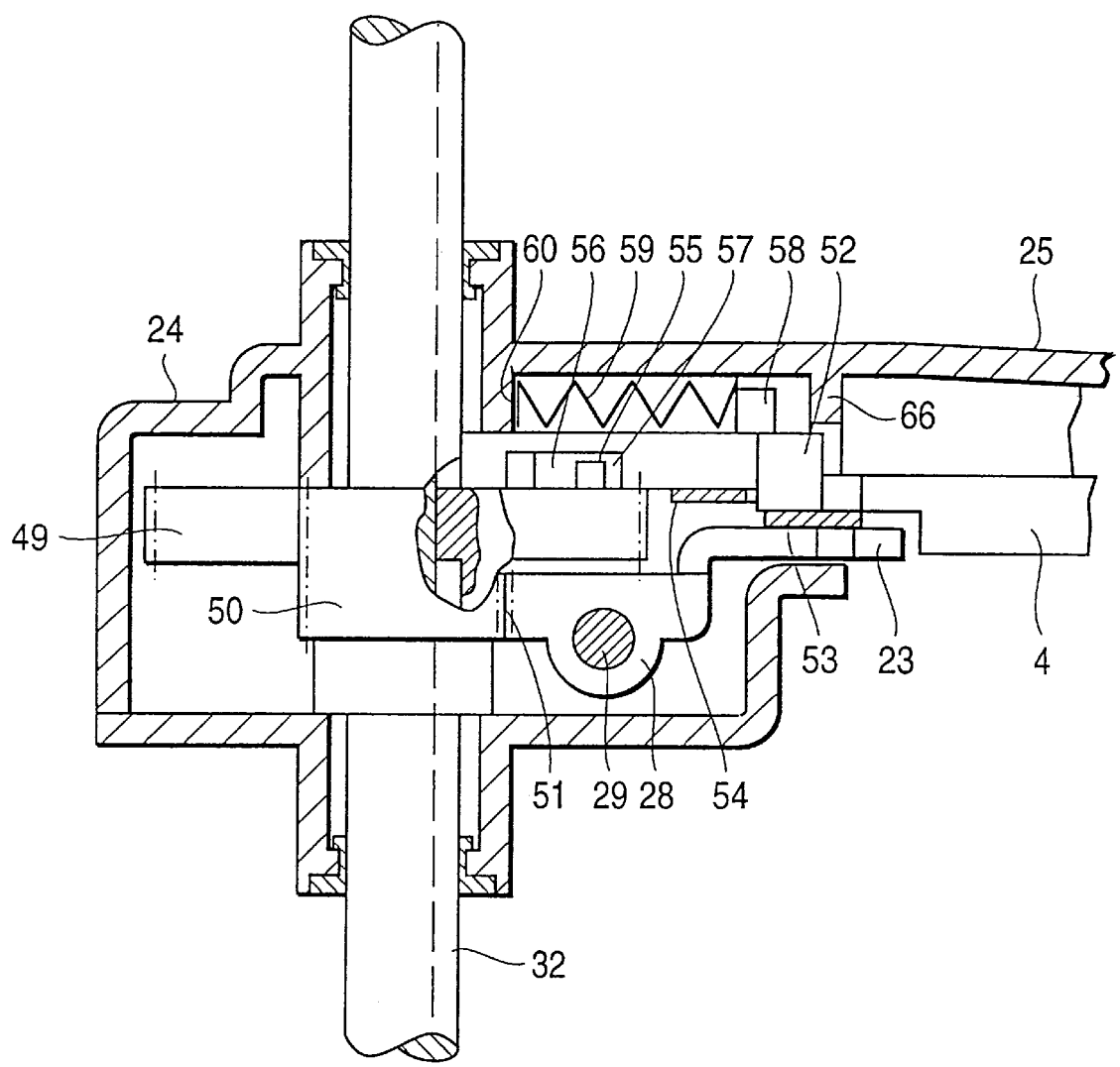
Figure 8:
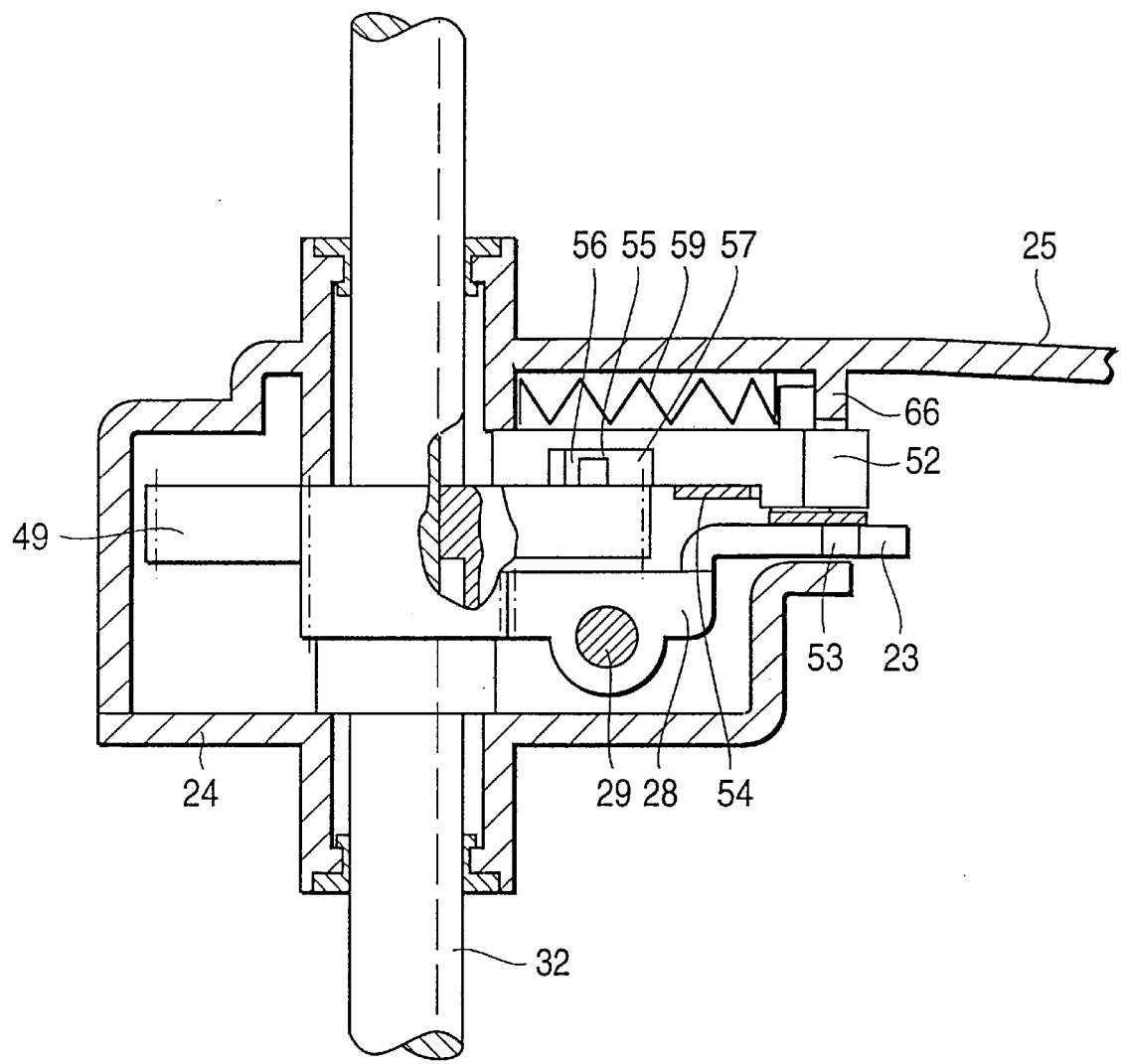

The gripper arm 23 is rigidly formed on a sled 28 which can be moved back and forth, by means of a drive 30, on a support rod 29 disposed in the housing 24 of the transport device 3. At each end side, the support rod 29 supports a stop 31 for the sled 28. Four possible end positions I through IV of the sled 28 are illustrated in FIG. 2. The end position I of the sled 28 is determined by the contact of the sled 28 with the right stop 31 of the support rod 29, in which the gripper arm 23 can travel vertically in the recesses 20 of the disc holder 4 of the right disc magazine 2, the recesses being located one above the other. If the gripper arm 23 assumes a withdrawal position behind the advancement lug 21 of the disc holder 4 containing the selected disc, the sled 28 travels into the end position II, which is determined by the disc holder recognition device 26 and in which the disc holder 4 is oriented with respect to the playback unit 5. If, in contrast, the gripper arm 23 located in the right disc magazine 2 assumes the position behind a free passageway 22 of a disc holder 4, the sled 28 travels into the end position III, in which the gripper arm 23 can travel vertically in the superposed recesses 20 of the disc holder 4 of the left disc magazine 2. If the gripper arm 23 in the left disc magazine 2 assumes a position behind the free passageway 22 of a disc holder 4, the sled 28 can again travel into the end position I. If, in contrast, the gripper arm 23 in the left disc magazine assumes a position behind the advancement lug 21 of a disc holder 4, the sled 28 travels into the end position IV, which is determined by the disc holder recognition device 26 and in which the disc holder 4 is oriented with respect to the playback unit 5.

Located centrally behind the disc magazine 2, in the rear region of the housing 1, is a vertically-extending support rod 32, on which the transport device 3 can move so as to slide up and down by means of a drive 33. The drive 33 encompasses a toothed belt 35, which extends parallel to the support rod 32, is guided by means of guide rollers 34, and is connected to the housing 24 of the transport device 3 by way of a clamping holder 36. The lower guide roller 34 is seated on the shaft 37 of a drive motor 38 which can reverse its direction of rotation. The shaft 37 of the drive motor 38 further supports a coding disk 39, which is configured as a blade wheel whose blades run in a sensor 40 configured as a forked coupler for generating positioning pulses. An exact allocation of the transport device 3, and thus of the gripper arm 23, to the advancement lugs 21 or the passageway 22 of the disc holders 4 in the disc magazines 2 is achieved with the aid of the positioning pulses. In order to stabilize the transport device 3, a notch 41 which extends so as to slide around a guide rod 42 extending between the bottom plate 9 and the cover plate 10 of the housing 1 is located to the side of the housing of the transport device.

The support rod 32 is rotatably seated in the bottom plate 9 and in the cover plate 10, and connected by way of a sliding clutch 43 and a worm gear pair 44 to a drive motor 45 that can reverse its direction of rotation. A coding disk 46, which is configured as a marking disk and runs by means of stationary sensors 47 configured as forked couplers for generating switching pulses for the drive motor 45, is attached to the sliding clutch 43. The drive motor 45 is switched off with the aid of the coding disk 46, and the respective end position of the sled 28 or the gripper arm 23 is monitored. A displaceable toothed wheel 49 which is fixed against relative rotation is seated inside the housing 24 of the transport device 3; this wheel meshes with two oppositely-located, stationary toothed wheels 50, which can be brought into engagement with a toothed rack 51 seated on the sled 28 of the gripper arm 23. Therefore, the back-and-forth motion of the sled 28 is produced by a different rotational movement of the support rod 32.

The disc holder recognition device 26 encompasses a spring-impinged, mechanical sensor 52, which projects into the path of movement of the disc holder 4 guided on a housing-secured guide rail 53 of the transport device 3. The sensor 52 is supported so as to slide on the guide rail 53, a holding element 54 secured to the housing and the toothed wheel 49. Located on the top side of the toothed wheel 49 is a pin 55, with which a free passageway 56 in the underside of the sensor 52 is associated. Projecting into the passageway 56 is a stop 57, against which the pin 55 comes to rest, on the right side or left side, in the state of the sensor 52 being operated by the disc holder, and the stop thus stops the rotational movement of the toothed wheel 49 and consequently the movement of the sled 28 in the end position II or IV, as a function of the side from which the pin 55 impacts against the stop 57. If the sensor 52 is not impacted by a disc holder 4, the pin 55 can move through the free passageway 56 of the sensor, by means of which the toothed wheel 49 is driven until the sled 28 has reached the end position I or III, depending on the direction of rotation in which the toothed wheel 49 was driven. In the illustration of the sled 28 shown in solid lines in FIG. 2, the sled is located in the end position II, in which the pin 55 of the toothed wheel 49 rests against the left side of the stop 57 of the sensor 52. If, for reasons of measuring technology, the path of the pin 55 from a left-side contact to a right-side contact with the stop 57 is too long to fix the sled 28 in the end position IV, a further pin 55' which, by means of its right-side contact with the stop 57, determines the end position IV of the sled 28, is disposed on the toothed wheel 49, at a corresponding distance from the pin 55. In the front region of its top side, the sensor 52 has a web 58, against which a compression spring 59 is supported whose other end rests against a housing-secured stop 60 in the region of the support rod 32. A housing-secured stop 66, against which the web 58 of the sensor 52 rests in the state in which the sensor 52 is not impacted by the disc holder 4, is located opposite the stop 60 at a corresponding distance.

A holding rail 61 for the disc holder 4 is secured to the free end of the support arm 25, opposite the housing-secured guide rail 53 of the transport device 3. Associated with the holding rail 61 is a central spring element 62, which is configured as a U-shaped yoke, and whose legs 63 are inserted into recesses on the support arm 25 and whose web has a bead 64 in the center which engages a corresponding notch 65 of the disc holder 4 in the centered position of the disc holder 4 with respect to the playback unit 5. The disc holder is consequently fixed immovably in its centered position.

Figure 9:
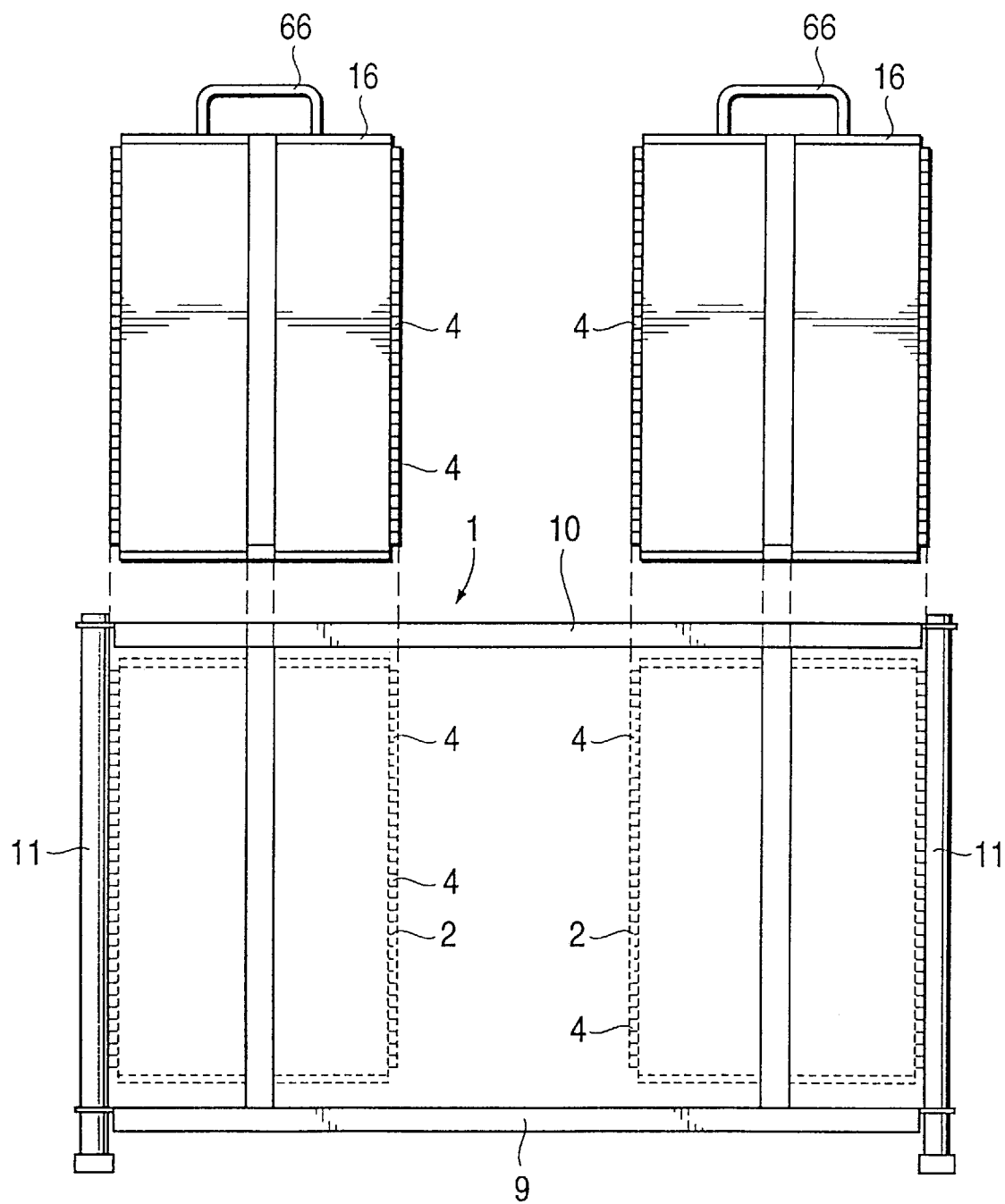

In the alternative embodiment of the housing 1 shown in FIG. 9, the disc magazines 2 can be inserted into the housing 1 from above following removal of the cover plate 10. In this instance, the cover wall 16 of each disc magazine 2 is provided with a fold-down carrying handle 66. This type of exchangeability of the disc magazines 2 is a particularly useful feature if no more free space is available in the horizontal peripheral region of the housing 1.

We claim:

1. A disc player having two disc magazines which are located opposite one another and have a plurality of disc holders which are stacked one above the other in respective receiving compartments and each of the plurality of disc holders receive a disc, and said disc player having a transport device which moves in the direction of the stacks of the plurality of disc holders of the two disc magazines in order to transfer a desired disc, with the associated disc holder, between the respective receiving compartment and a playback unit, said transport device having a horizontally-traveling withdrawal device which includes a sled that has a single gripper arm, said single gripper arm being rigidly connected to the sled and serves both of said disc magazines, said single gripper arm being arranged to travel vertically from an assumed selection position in one or the other disc magazine into superposed recesses formed in the disc holders of the respective disc magazine.

2. The disc player according to claim 1, wherein said single gripper arm moves from the selection position in one or the other disc magazine into a withdrawal position for removing a specific disc holder, in which position said single gripper arm is aligned with an advancement lug which adjoins the recess of the disc holder and wherein the advancement lug is chamfered at half the height of the disc holder.

3. The disc player according to claim 2, wherein said single gripper arm travels, by means of a disc holder recognition device associated with the transport device, into a centering position which fixes the selected disc, with the selected disc holder, concentrically with respect to a turntable of the playback unit.

4. The disc player according to claim 3, further comprising a sensor associated with the disc holder recognition device that, when said sensor is impacted by the selected disc holder removed from one of said two disc magazines, the single gripper arm rigidly connected to said sled of the withdrawal device travels into a centering position which fixes the selected disc, with said selected disc holder, concentrically with respect to the turntable of the playback unit.

5. The disc player according to claim 3, wherein said disc holder recognition device comprises a mechanical sensor which is guided in spring-loaded fashion in a housing of said transport device, the sensor projects into the path of movement of said selected disc holder and limits the rotational movement of a toothed wheel disposed on a support rod of the transport device when the sensor is impacted by said selected disc holder.

6. The disc player according to claim 5, further comprising a pin on a top side of said toothed wheel disposed on the support rod said pin moves through a passageway in an underside of said sensor in an inoperative state of said sensor and which rests against a stop projecting into said passageway in the centered position of said selected disc holder with respect to said playback unit.

7. The disc player according to claim 5, wherein said sensor has a web located in a front region of a top side thereof, said web rests in spring-loaded fashion against a first housing-secured stop in the inoperative state of said sensor.

8. The disc player according to claim 7, further comprises a second housing-secured stop located opposite said first housing-secured stop for the web of said sensor, said second housing-secured stop being located in the region of said support rod, and a compression spring supported against said second housing-secured stop at one end and which rests against the web of said sensor at the other end.

9. The disc player according to of claim 5, wherein said sensor is guided on a holding element and has a front region which extends beyond a guide rail secured on the housing of said transport device for said disc holder.

10. The disc player according to claim 9, wherein said housing of said transport device has a support arm with a holding rail for said plurality of disc holders, said support arm being located opposite the housing-secured guide rail, wherein at least one spring element which secures said selected disc holder in the centered position with respect to said playback unit is associated with said holding rail.

11. A disc player according to claim 10, wherein said spring element is injection-molded onto said holding rail and latches in an associated notch of said selected disc holder.

12. A disc player according to claim 10, wherein said spring element comprises a U-shaped yoke with legs that are inserted into recesses on said support arm and with a web that has a bead in the center which engages a notch located on the corresponding longitudinal side of said selected disc holder.

13. The disc player according to claim 2, further comprising a housing which comprises a bottom plate and a cover plate which are connected to one another solely by means of connecting elements, said cover plate being removable and the connecting elements being changeable in length.

14. The disc player according to claim 13, wherein said connecting elements are configured as rods, angled sheet metal.

15. The disc player according to claim 13, further comprises panelling elements between said connecting elements of said bottom plate and said cover plate of said housing.

16. The disc player according to claim 13, further comprises at least one stabilizing element arrangement between said cover plate and said bottom plate.

17. The disc player according to claim 13, wherein the two disc magazines can be inserted into the housing from the top side of the housing so as to be exchanged vertically.

18. The disc player according to claim 1, wherein the transport device travels vertically, by means of a drive, on a rotatably-driven support rod which drives said sled of the withdrawal device by way of a gear, said sled being rigidly connected to said single gripper arm.

19. The disc player according to claim 1, wherein said transport device is seated so as to slide on a support rod and moves up and down via a belt drive having a drive motor, said drive motor can reverse the direction of rotation of the belt drive.

20. The disc player according to claim 1, wherein said transport device has a lateral notch which extends around a vertical, housing-secured guide rod so as to slide.

21. The disc player according to claim 1, wherein a drive motor of the transport device supports on a shaft thereof a coding disk which cooperates with a sensor that generates positioning pulses.

22. The disc player according to claim 1, further comprising a sensor associated with said transport device for determining the initial position of said transport device directly above said playback unit.

23. The disc player according to claim 1, wherein said transport device has a rotatably-seated support rod connected by way of a sliding coupling and a gear to a drive motor which can reverse the direction of rotation of the rotatably-seated support rod, wherein, inside said transport device, said support rod supports a toothed wheel which can be displaced on said support rod and is fixed against relative rotation and meshes with at least one other toothed wheel which engages a toothed rack disposed on said sled of said single gripper arm.

24. The disc player according to claim 23, wherein said support rod is fixedly connected to a coding disk which runs by means of stationary sensors for generating shutoff pulses for said drive motor of said support rod.

25. The disc player according to claim 24, wherein said coding disk is configured as a perforated or marking disk.

26. A disc player according to claim 1, wherein each of said two disc magazines inserted in drawer fashion into a housing from a front side of the housing is secured in its position by at least one detachable connection.

27. A disc player according to claim 26, wherein said at least one detachable connection between the respective disc magazine and the housing is configured as a clip connection.

28. A disc player according to claim 1, further comprising a housing having two oppositely-located guide rails for receiving one of said two disc magazines, said rails correspond with a corresponding groove in a bottom wall or in a cover wall, respectively, of said two disc magazines.

29. A disc player according to claim 28, further comprising a clip tongue having a projecting clip latch which is formed into each of said guide rails, said clip latch latches in an associated opening in the bottom wall or the cover wall, respectively, of said two disc magazines.

* * * * *